(12) United States Patent
Morales et al.

(10) Patent No.: US 7,548,705 B2
(45) Date of Patent: Jun. 16, 2009

(54) SYSTEMS AND METHODS FOR MARKING TEST PATCHES FOR CALIBRATING AND/OR VISUALLY CONFIRMING COLOR ACCURACY OF A MARKING DEVICE

(75) Inventors: Javier A. Morales, Irondequoit, NY (US); Michael E. Farrell, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 336 days.

(21) Appl. No.: 11/695,824

(22) Filed: Apr. 3, 2007

(65) Prior Publication Data

US 2008/0247770 A1    Oct. 9, 2008

(51) Int. Cl.
*G03G 15/00* (2006.01)
(52) U.S. Cl. .......................... 399/49; 399/72
(58) Field of Classification Search .................... 399/49, 399/60, 72
See application file for complete search history.

(56) References Cited

U.S. PATENT DOCUMENTS

| 5,450,165 | A | 9/1995 | Henderson |
| 6,538,770 | B1 * | 3/2003 | Mestha ................ 358/1.9 |
| 6,556,300 | B2 | 4/2003 | Tandon et al. |
| 6,621,576 | B2 | 9/2003 | Tandon et al. |
| 6,633,382 | B2 | 10/2003 | Hubble, III et al. |
| 6,639,669 | B2 | 10/2003 | Hubble, III et al. |
| 6,721,692 | B2 | 4/2004 | Mestha et al. |
| 6,952,283 | B2 | 10/2005 | Thieret |
| 7,269,369 | B2 * | 9/2007 | Tezuka et al. ................ 399/72 |
| 2004/0136013 | A1 | 7/2004 | Mestha et al. |
| 2004/0136015 | A1 | 7/2004 | Van de Capelle et al. |
| 2006/0197966 | A1 | 9/2006 | Viturro et al. |
| 2006/0221340 | A1 | 10/2006 | Viturro et al. |

OTHER PUBLICATIONS

U.S. Appl. No. 11/428,489, filed Jul. 3, 2006 in the name of R. Viturro et al. and entitled "Pitch to Pitch Online Gray Balance Calibration."
U.S. Appl. No. 11/242,423, filed Sep. 30, 2005 and entitled "Pitch to Pitch Online Gray Balance Calibration With Dynamic Highlight and Shadow Controls."

* cited by examiner

*Primary Examiner*—Hoang Ngo
(74) *Attorney, Agent, or Firm*—Oliff & Berridge, PLC (57) ABSTRACT

A printer or other marking device forms a first desired image in a first area, such as a main image area, of a first substrate; forms a first portion of a set of test patches in a margin area of the first substrate; forms a second desired image in a first area, such as a main image area, of a second substrate; and forms a second portion of the set of test patches in a margin area of the second substrate. A measuring device such as a spectrophotometer may be used to measure each test patch, and based on the measured values, a color calibration is performed for use in a subsequent marking operation. The color calibration may include generating or modifying a tone reproduction curve based on the measured values. The margin areas may be later trimmed off, thereby removing the portion of the substrates on which the test patches are formed.

15 Claims, 9 Drawing Sheets

SYSTEMS AND METHODS FOR MARKING TEST PATCHES FOR CALIBRATING AND/OR VISUALLY CONFIRMING COLOR ACCURACY OF A MARKING DEVICE

CROSS-REFERENCE TO RELATED APPLICATIONS

This application is related to the following U.S. patents and patent applications, the disclosures of which are incorporated herein by reference in their entirety:

U.S. patent application Ser. No. 08/200,601, filed on Feb. 23, 1994, now issued as U.S. Pat. No. 5,450,165 and entitled "System For Identifying Areas hi Pre-Existing Image Data As Test Patches For Print Quality Measurement";

U.S. patent application Ser. No. 09/837,801, filed on Apr. 17, 2001, now issued as U.S. Pat. No. 6,952,283 and entitled "Sampling of Customer Images As Color Data For Process Control";

U.S. patent application Ser. No. 09/862,247, filed on May 22, 2001, now issued as U.S. Pat. No. 6,621,576 and entitled "Color Imager Bar Based Spectrophotometer for Color Printer Color Control System";

U.S. patent application Ser. No. 09/862,945, filed on May 22, 2001, now issued as U.S. Pat. No. 6,633,382 and entitled "Angular, Azimuthal and Displacement Insensitive Spectrophotometer for Color Printer Color Control Systems";

U.S. patent application Ser. No. 09/863,042, filed on May 22, 2001, now issued as U.S. Pat. No. 6,556,300 and entitled "Color Imager Bar Based Spectrophotometer Photodetector Optical Orientation";

U.S. patent application Ser. No. 09/949,475, filed on Sep. 10, 2001, now issued as U.S. Pat. No. 6,639,669 and entitled "Diagnostics for Color Printer On-line Spectrophotometer Control System";

U.S. patent application Ser. No. 10/248,387, filed on Jan. 15, 2003 and entitled "Systems and Methods for Obtaining a Spatial Color Profile and Calibrating a Marking System";

U.S. patent application Ser. No. 10/342,8735 filed on Jan. 15, 2003 and entitled "Iterative Printer Control and Color Balancing System and Method Using a High Quantization Resolution Halftone Array to Achieve Improved Image Quality with Reduced Processing Overhead";

U.S. patent application Ser. No. 11/070,681, filed on Mar. 2, 2005 and entitled "Gray Balance for a Printing System of Multiple Marking Engines";

U.S. patent application Ser. No. 11/097,727, filed on Mar. 31, 2005 and entitled "Online Gray Balance Method with Dynamic Highlight and Shadow Controls";

U.S. Pat. No. 6,721,692 to Mestha et al., entitled "Systems And Methods For Determining Spectra Using Dynamic Least Squares Algorithms With Measurements From LED Color Sensor";

U.S. patent application Ser. No. 11/242,423, filed on Sep. 30, 2005 and entitled "Pitch To Pitch Online Gray Balance Calibration With Dynamic Highlight and Shadow Controls"; and U.S. patent application Ser. No. 11/428,489, filed on Jul. 3, 2006 and entitled "Pitch To Pitch Online Gray Balance Calibration."

BACKGROUND

This disclosure generally relates to calibration and/or confirming color accuracy of marking systems.

This disclosure refers to marking as a process of producing a pattern, such as text and/or images, on a substrate, such as paper or transparent plastic. A marking device performs the marking by depositing ink, toner, dye, or any other suitable marking material on the substrate. Known marking devices include xerographic marking engines and inkjet marking engines.

Various factors affect the actual color produced by a marking device in response to a given input. Thus, to achieve a desired color on a marked substrate, or rather, to get as close to the desired color as possible, typically it is necessary to perform calibration by marking test patches on a substrate, analyzing the marked test patches with a spectrophotometer or other color measuring device, and generating or updating a color calibration value or set of values such as a tone reproduction curve (TRC). The TRC is then used to alter the theoretical combination of marking material (e.g., C (cyan), M (magenta), Y (yellow) and K (black) toners or inks) to produce more accurate color on subsequently marked substrates, by mapping image data input values (e.g., RGB values) to marking device output values (e., CMYK values). A set of test patches, also known as a target or target patch pattern, can include any desired number of test patches, from one patch to over 1,000 patches, but typically includes from several dozen to several hundred test patches.

SUMMARY

This disclosure discusses producing a set of test patches in the margins of a plurality of substrates, outside the normal image forming area in which a user-defined image is formed. This concept may be particularly useful in, for example, large printers used by publishers or the like, which typically use oversize paper that is subsequently trimmed and/or folded during the process of producing a professional-quality document, a book or the like. For example, it is known to print on 12"×18" paper, and then trim off the margins of the paper after printing. Producing the test patches in margins, rather than interrupting a printing process to print the test patches on a separate substrate, reduces paper waste and reduces process interruption, thereby enhancing productivity and efficiency.

A first subset of the test patches may be marked in a margin of a first substrate, a second subset of the test patches may be marked in a margin of a second substrate, and so on until the entire set of test patches has been marked. The marked test patches may be read by a color measurement device, such as a spectrophotometer, either inline or offline, and the output of the color measurement device may be used to update a TRC or other color calibration value to improve the color in subsequent marking operation of the marking device. Alternatively or additionally, the test patches may be visually observed by a user, so that the user can confirm that color is generally acceptable and/or determine whether a calibration is needed.

The layout of the test patches on each substrate may be dynamically determined, based on incoming image data, for example, so that margin areas of the substrates may be used efficiently.

BRIEF DESCRIPTION OF THE DRAWINGS

Exemplary embodiments will be described with reference to the accompanying drawings, in which like numerals represent like parts, and wherein.

EMBODIMENTS

Figure 1:
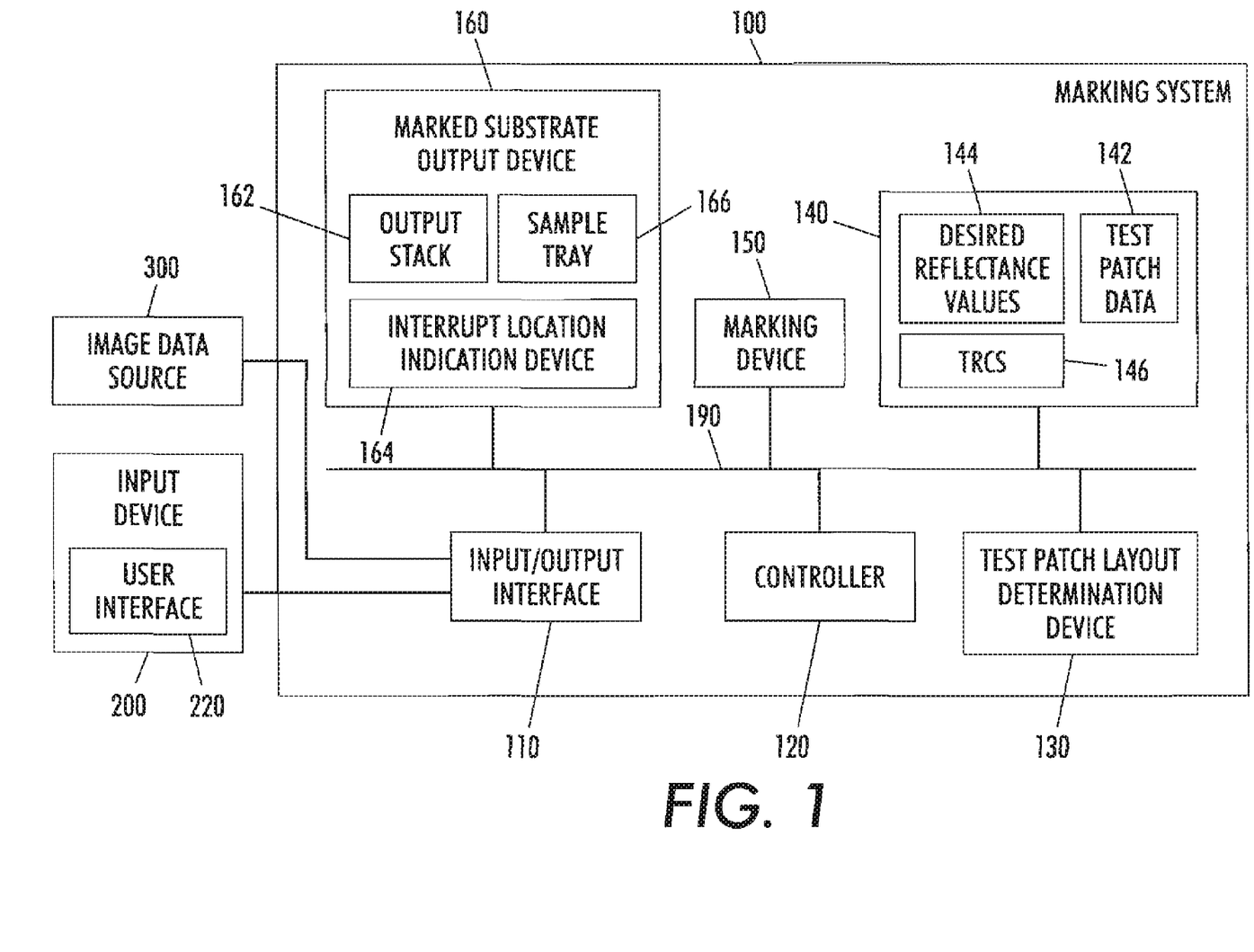
FIG. 1 is a functional block diagram illustrating a first exemplary embodiment of a marking system.

FIG. 1 is a functional block diagram illustrating a first exemplary embodiment of a marking system 100. The marking system 100 is connected to an input device 200 via a link 210, which may be a wired, wireless or optical link, and an input/output interface 110. The input device 200, which may include a user interface 220, may be used to input various information that may be needed to implement the operations of the marking system 100, such as user instructions, as described in more detail below. The user input device 200 and/or user interface 220 may include a mouse, a keyboard, a touch-screen input device, a voice recognition-based input device, and/or any other known or later developed device usable for inputting information. In some embodiments, the input device 200 and/or user interface 220 may be part of the marking system 100 itself, and, e.g., may be connected directly to the bus 190 and/or controller 120 of the marking system 100, without being connected via an input/output interface such as the input/output interface 110.

The marking system 100 is connected to an image data source 300 via a link 310 via the input/output interface 110. The image data source 300 can be a digital camera, a scanner, or a locally or remotely located computer that, e.g., includes a word processing program and/or document creation program or the like, or any other known or later developed device that is capable of generating electronic image data. Similarly, the image data source 300 can be any suitable device that stores and/or transmits electronic image data, such as a client or a server of a network. The link 310 can thus be or include any known or later developed wired, wireless or optical device for transmitting the electronic image data from the image data source 300 to the marking system 100.

Further, it should be appreciated that either or both of the links 210 and 310 can be a wired, wireless or optical link to a network (not shown). The network can be a local area network, a wide area network, an intranet, the Internet, or any other distributed processing and storage network.

The marking system 100 includes the controller 120, a test patch layout determination device 130, a memory 140, a marking device 150 and a marked substrate output device 160, which are interconnected as appropriate, e.g., by a data/control bus 190. The data/control bus 190 may be a distinct entity, or may be part of the controller 120, for example.

The controller 120 controls the operation of other components of the marking system 100, performs any necessary calculations and executes any necessary programs for implementing the processes of the marking system 100 and its individual components, and controls the flow of data between other components of the marking system 100 as needed.

The test patch layout determination device 130 is not necessarily present in all embodiments, but when present, the test patch layout determination device 130 dynamically determines an appropriate layout of test patches in margins of substrates, as described in more detail hereafter. "Dynamically determines," as used herein, means that the layout is determined based on incoming data on a per-page basis, a per-job basis, or some other periodic basis, and thus the layout is not necessarily the same for every page or for every job.

The memory 140 may include a section that stores test patch data 142, a section that stores desired reflectance values 144, and a section that stores calibration data, such as one or more tone reproduction curves (TRCs) 146. The memory 140 also includes other storage sections as appropriate.

The memory 140 may serve as a buffer for information coming into or going out of the marking system 100, may store any necessary programs and/or data for implementing the functions of the marking system 100, such as a program for causing a computer to implement the exemplary methods described below, and/or may store data at various stages of processing. Furthermore, it should be appreciated that the memory 140, while depicted as a single entity, may actually be distributed. Alterable portions of the memory 140 are, in various exemplary embodiments, implemented using static or dynamic RAM. However, the memory 140 can also be implemented using a floppy disk and disk drive, a writeable optical disk and disk drive, a hard drive, flash memory or the like. The generally static portions of the memory 140 are, in various exemplary embodiments, implemented using ROM. However, the static portions can also be implemented using other non-volatile memory, such as PROM, EPROM, EEPROM, an optical ROM disk, such as a CD-ROM or DVD-ROM, and disk drive, flash memory or other alterable memory, as indicated above, or the like.

The marking device 150 may be a xerographic marking device, an inkjet marking device, or any other type of marking device. For example, the marking device 150 may be or include a Digital Front End (DFE). The marking device 150 marks user-defined images, e.g., images of documents or other electronic information created, copied, or otherwise generated by a user, based on incoming data from the image data source 300. The marking device 150 also marks test patches in margin areas of substrates, as explained in more detail below, based on the test patch data 142 that is pre-stored in the memory 140.

The marked substrate output device 160 outputs marked substrates to an output stack 162. The marked substrate output device 160 may include an interrupt location indication device 164, and may include a sample tray 166. When a user desires to check image quality of the marking system 100, the user may input a user instruction that commands the marking device 150 to output, as a sample, a plurality of substrates on which test patches are marked as described in more detail below. The plurality of substrates that constitute the sample may be output to the sample tray 166. The user instruction may cause the marking system 100 to begin marking a set of test patches in margin areas of the substrates that will constitute the sample, in a manner described below. Alternatively, the marking system 100 may mark test patches continuously, and the user instruction may simply cause the marked substrate output device 160 to divert already-marked substrates to the sample tray 166.

When the user instruction commanding output of a sample is received by the marking system 100, the controller 120 may cause the interrupt location indication device 164 to apply an interrupt location indication to the output stack 162 of substrates. For example, as the interrupt location indication, the interrupt location indication device 164 may offset, i.e., laterally shift the location of, one or more substrates on the output stack. The offset substrate or substrates may be marked substrates that are part of the current marking job. Alternatively or additionally, the interrupt location indication device 164 may output, with or without an offset, a special insert sheet, such as a sheet of a different color and/or plan-view shape (e.g., a sheet having a protruding tab or the like) and/or size, to the output stack 162.

Thus applying an interrupt location indication to the output stack 162 allows the sample to be returned to the output stack 162 in its proper order after the user has viewed it and/or obtained reflectance values from it, if it is important that the print order of the job be maintained, for example. Thus, the sample can be part of the actual marking job, and does not become an extraneous set of substrates that is simply discarded after being used to check image quality.

Figure 2:
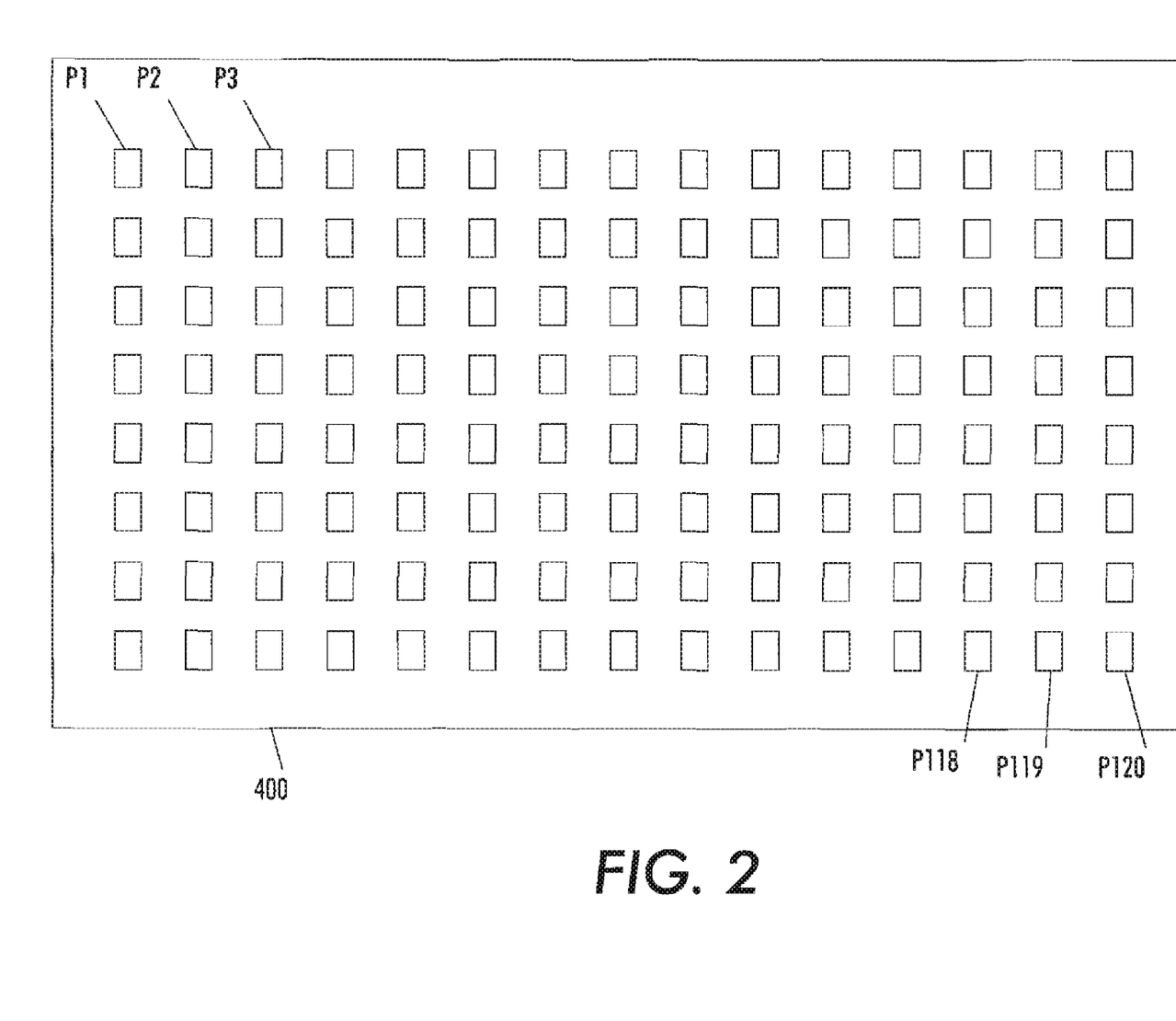
FIG. 2 schematically illustrates an exemplary set of test patches.
Figure 3:
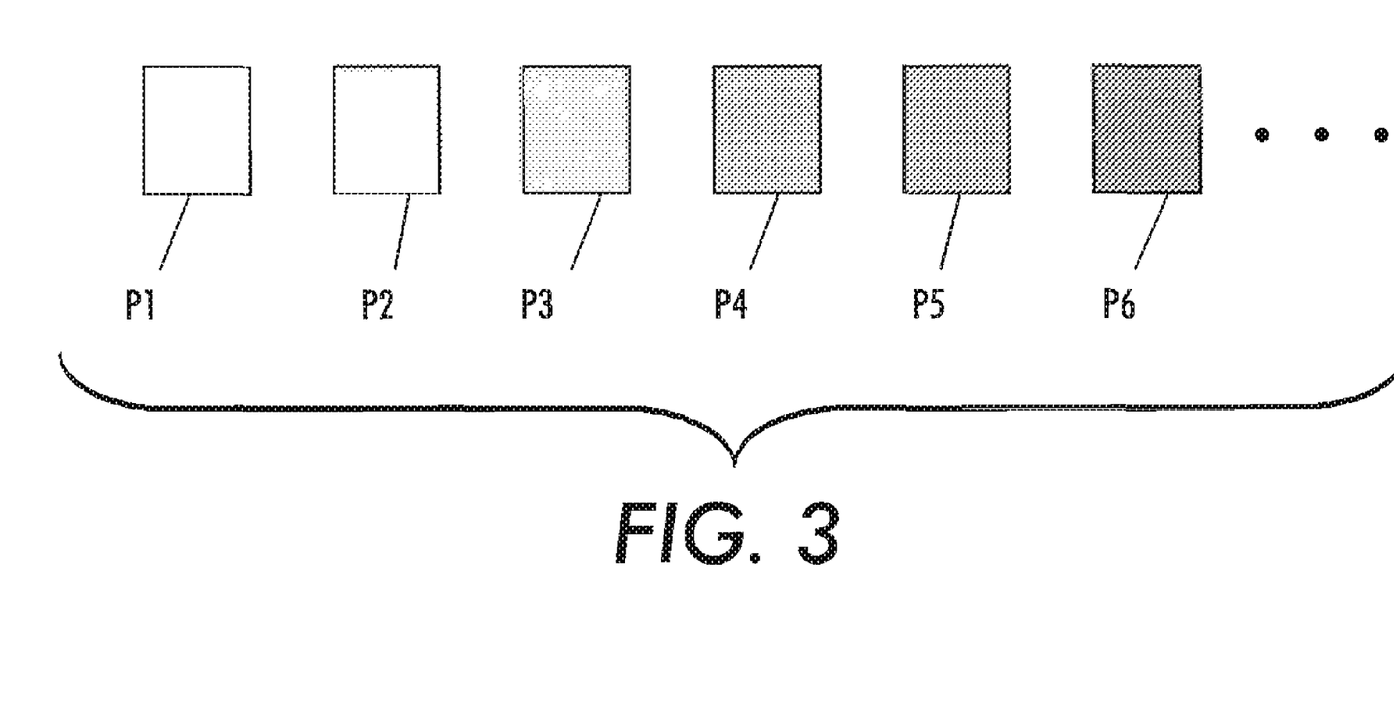
FIG. 3 illustrates in more detail some of the test patches of FIG. 2.

FIG. 2 schematically illustrates an exemplary target 400, comprising a set of test patches P1 through P120. Of course, the target 400 may include any desired number of test patches. As illustrated in FIG. 3, the test patches P1, P2, P3, etc. have different color and/or shade combinations. The target 400 may be a standard target known in the industry, or may be a customized target defined by a particular user or company, for example. The test patch data 142 corresponds to the test patches of the target 400. Additionally, test patch data of a plurality of targets may be stored in advance, and the user may select a desired one of the targets to use.

Figure 4:
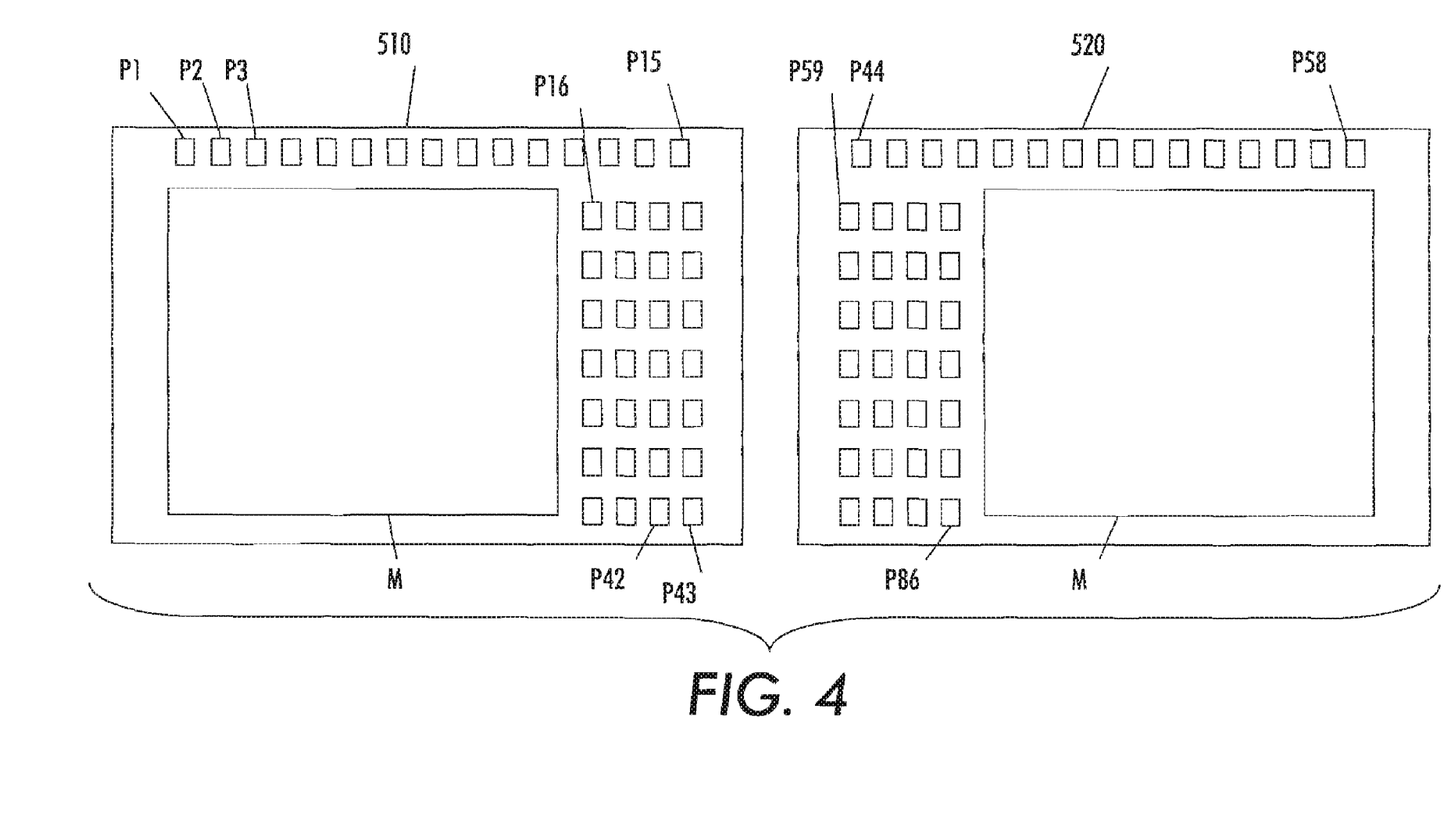
FIG. 4 illustrates exemplary substrates that each include a subset of the test patches of FIG. 2.

FIG. 4 illustrates exemplary substrates 510 and 520 that each include a main image area M, in which a user-defined image is marked, and a margin area (also referred to as "margin" hereafter), in which a subset of the test patches of FIG. 2 is marked based on the test patch data 142 and the layout determined by the test patch layout determination device 130. In this example, the substrate 510 includes the subset of test patches P1 through P43, and the substrate 520 includes the subset of test patches P44 through P86. The controller 120 controls placement of the test patches based on, e.g., the size of the substrates 510 and 520 and the size and position of the main image area. The size of the substrates 510 and 520 may be known by the system in advance based on user input, etc., or may be detected by one or more appropriate sensors in any known or later developed manner. The size and position of the main image areas M may be known based on the image data received from the image data source 300. For example, the size and position of the main image areas M may be determined by the test patch layout determination device 130 based on the Page Description Language (PDL) in which the image data is described.

In the example shown in FIG. 4, the complete set of test patches P1 through P120 does not fit in the margins of the substrates 510 and 520. Therefore, additional subsets of test patches will be marked in margins of additional substrates as necessary until all 120 test patches have been marked. Additionally, in the example shown in FIG. 4, the test patches are placed in consecutive order, left to right and top to bottom. However, this is not necessarily the order in which they are marked, as will be appreciated by those skilled in the art. Additionally, the placement order may be altered if desired, for better efficiency in reading the test patches with a spectrophotometer or other reflectance measuring device. For example, if the reflectance measuring device follows a serpentine path when reading the test patches (e.g., reads a row of test patches left-to-right, steps down and reads the next row right-to-left, etc.), the placement order of the test patches may also follow a serpentine path. The placement order of the test patches should match the order in which the reflectance measuring device expects to encounter the test patches, if the reflectance measuring device is not functionally connected to the marking system 100, so that a meaningful result is obtained. Alternatively, if the reflectance measuring device is connected to or is part of the marking system as discussed below, the controller 120 may construct a meaningful result from the output of the reflectance measuring device regardless of the read order because the controller 120 "knows" which test patch is marked at what position.

When substrates collectively bearing the complete set of test patches P1 through P120 have been output, e.g., to the sample tray 166, the user may position the substrates relative to a reflectance measuring device such as a spectrophotometer and cause the reflectance measuring device to obtain a reflectance value from each patch. These measured reflectance values are then input into the marking system 100 through an appropriate interface, compared with the desired reflectance values 144, and used to generate or update the TRCs 146 or other color calibration values stored in the memory 140.

Figure 5:
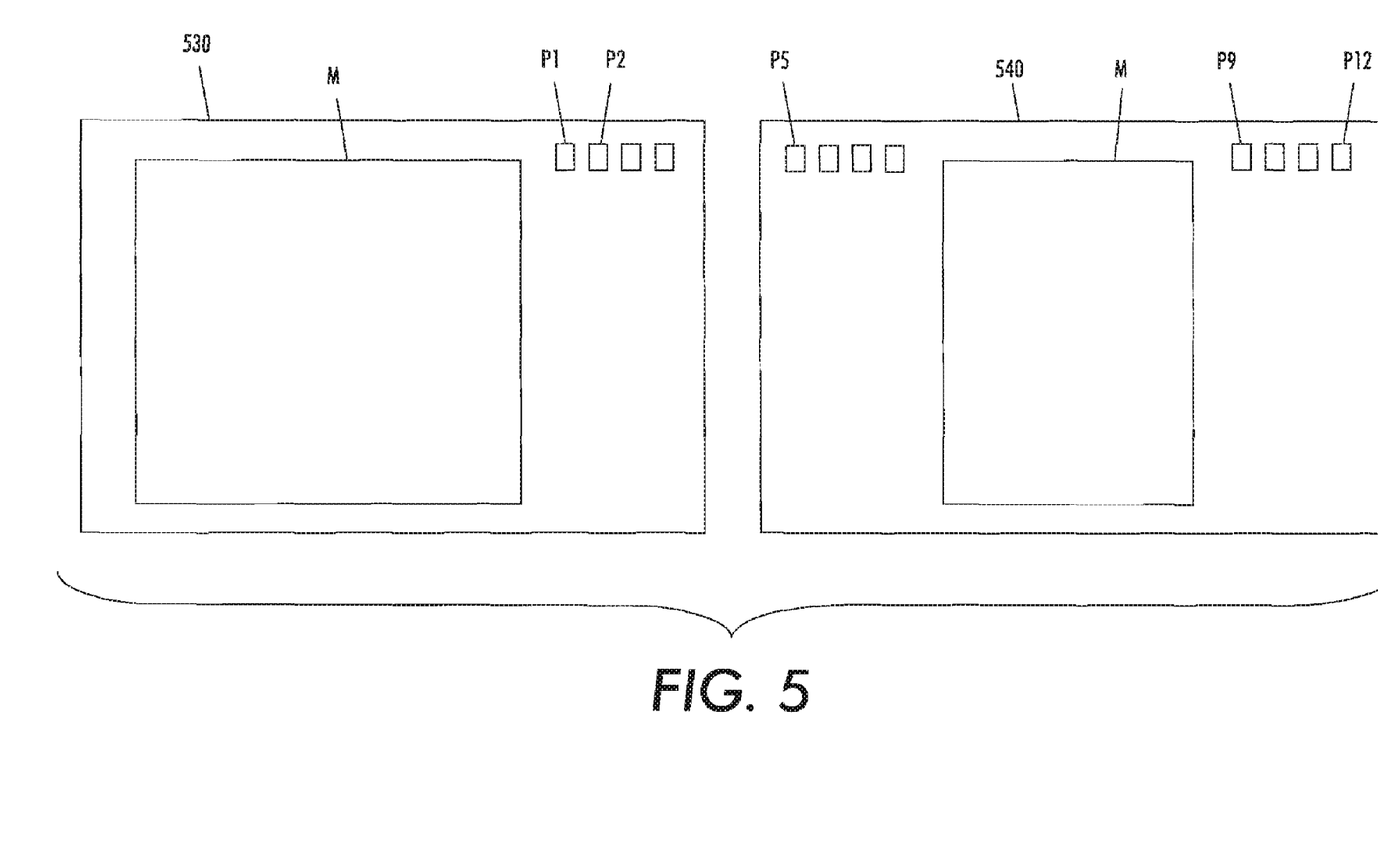
FIG. 5 illustrates other exemplary substrates that each include a subset of the test patches of FIG. 2.

FIG. 5 illustrates other exemplary substrates 530 and 540 that each include a subset of the test patches of FIG. 2. In this example, the substrate 530 includes the subset of test patches P1 through P4, and the substrate 540 includes the subset of test patches P5 through P12. In this example, the test patches are printed in a single row. This approach is less efficient in terms of utilizing the margin areas, but may be better suited to inline calibration techniques, such as described below in connection with FIG. 7, for example, in which a reflectance measuring device is placed along the marked substrate output patch and feeds measured values back to the marking system 100 for inline color calibration. A reflectance measuring device with a single sensor may be mounted so as to be stationary with respect to the marking system, and the row of test patches may be positioned so as to pass the mounted sensor to be read by the sensor. As with the embodiment shown in FIG. 4, the layout of the test patches may be determined by the test patch layout determination device 130 based on, e.g., the size and position of the main image area M of each substrate.

Figure 6:
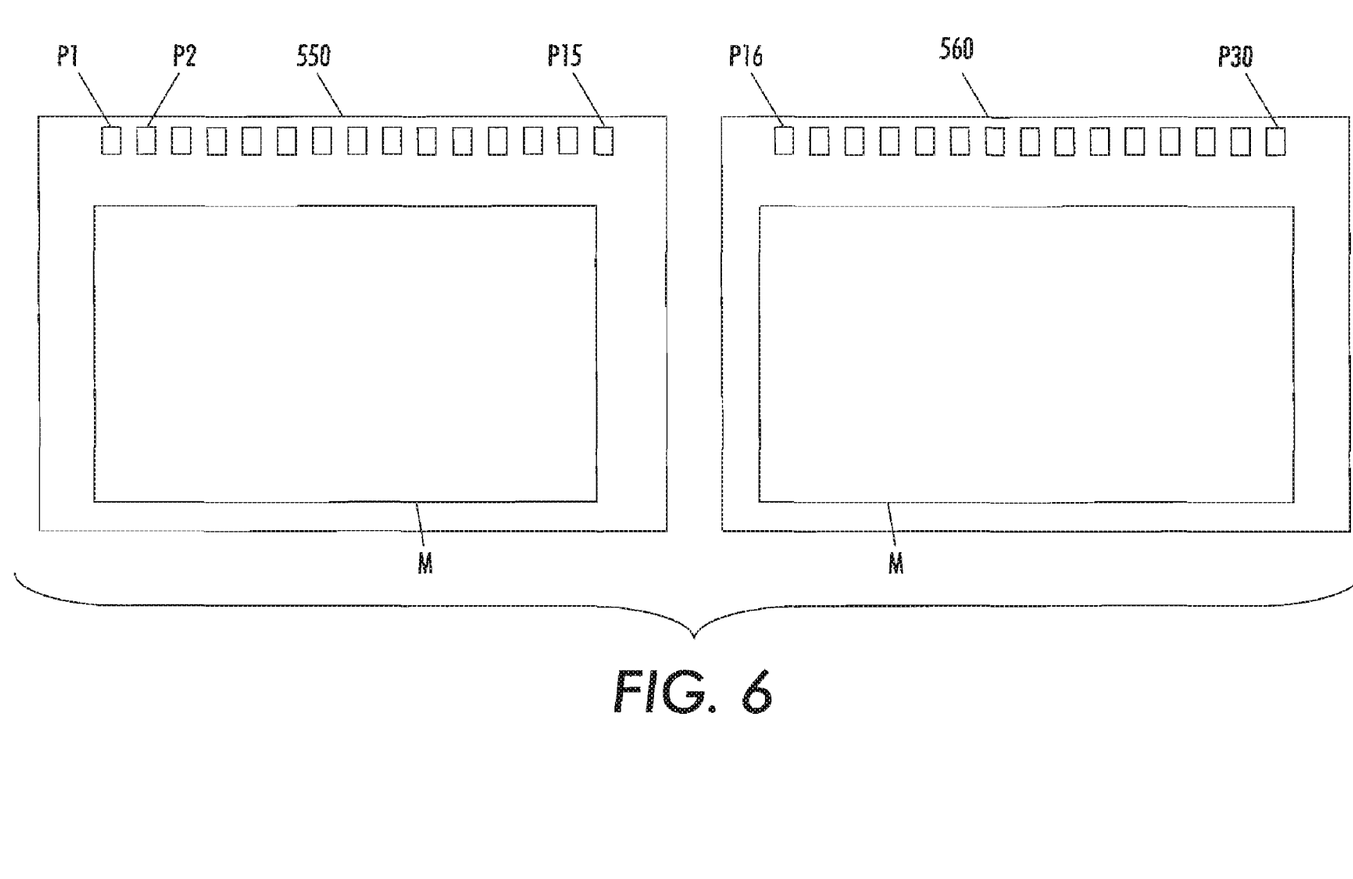
FIG. 6 illustrates other exemplary substrates that each include a subset of the test patches of FIG. 2.

FIG. 6 illustrates other exemplary substrates 550 and 560 that each include a subset of the test patches of FIG. 2. In this example, the substrate 550 includes the subset of test patches P1 through P15, and the substrate 560 includes the subset of test patches P16 through P30. In this embodiment, the layout of the patches can be determined by the test patch layout determination device 130 on a per-job basis, because it is assumed that, in the context of this embodiment, the margins will be the same for every substrate that is part of the same job (but different jobs may have different margins). In FIG. 6, the test patches are placed in single row, and thus well adapted for inline calibration as described above in connection with FIG. 5, but the same per-job concept can also be applied to embodiments that print test patches in multiple rows.

Some embodiments may not require a test patch layout determination device 130, because the usage context may be such that it may be assumed that the margins are always the same, or at least that a given portion of a substrate will always be available for marking test patches. In this case, the test patches may simply be marked consecutively, one subset per substrate, continuing across the margins of multiple substrates until the entire set of patches has been marked.

Figure 7:
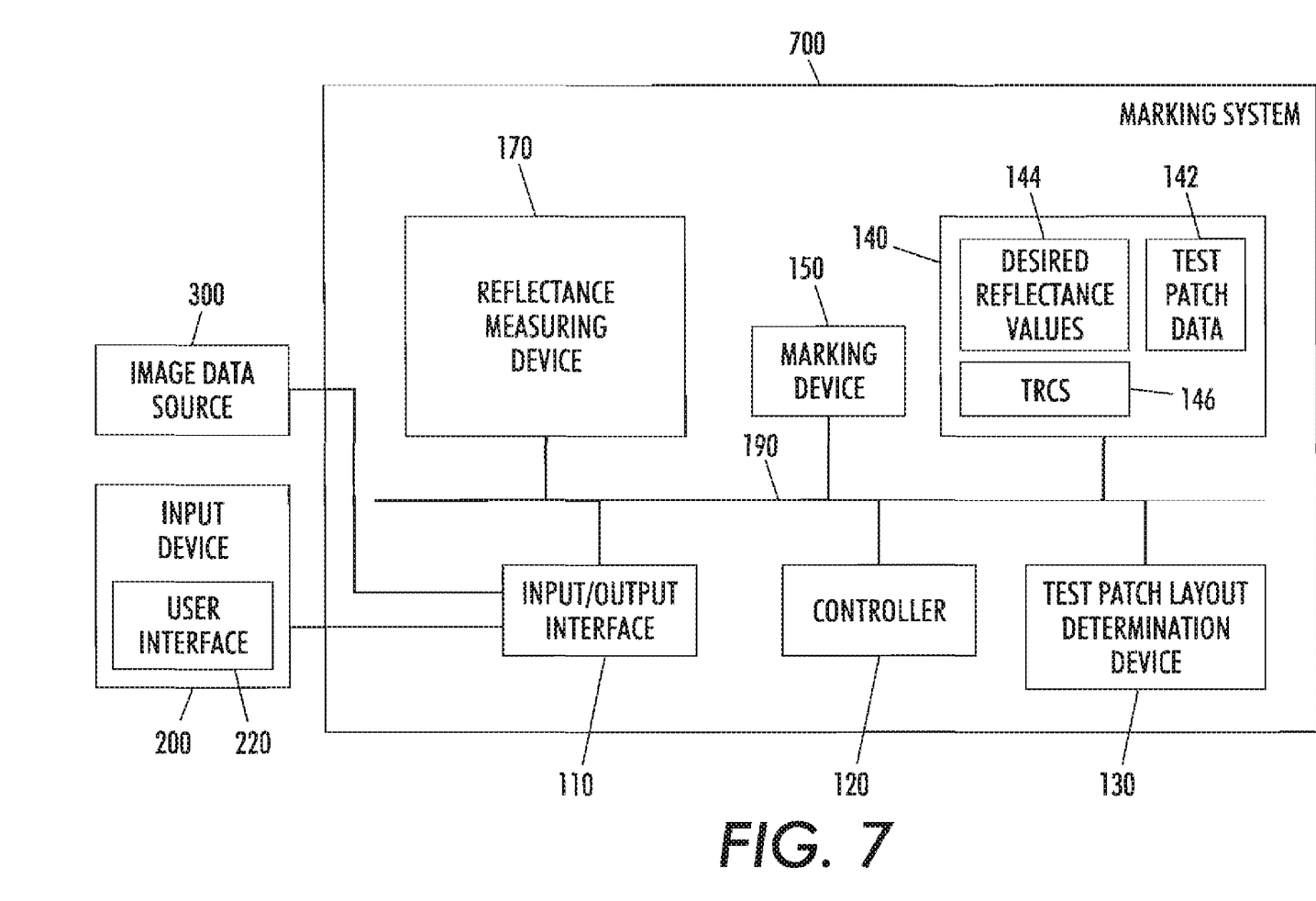
FIG. 7 is a functional block diagram illustrating a second exemplary embodiment of a marking system.

FIG. 7 is a functional block diagram illustrating a second exemplary embodiment of a marking system 700, which is adapted for (but not necessarily limited to) inline color calibration. The marking system 700 includes a reflectance measuring device 170, which may be any known or later-developed reflectance measuring device such as a LED-based spectrophotometer or other spectrophotometer. The stricture and operation of the marking system 700 otherwise may be similar to that of the marking system 100 described above. Reflectance values measured by the reflectance measuring device 170 are fed back to the marking system 100 and compared to desired reflectance values 144 to generate or update the TRCs 146 or other color calibration values stored in the memory 140. An example of a color calibration algorithm that may be used is described in U.S. Pat. No. 6,721,692 to Mestha et al.

It will be understood that the circuits shown in FIGS. 1 and 7, e.g., the controller 120, the test patch layout determination device 130, circuits associated with the marking device 150, marked substrate output device 160, reflectance measuring device 170, or portions of any of these, can be implemented in software in a suitably programmed general purpose computer. Alternatively, each of the circuits shown in FIGS. 2 and 3 can be implemented as physically distinct hardware circuits within an ASIC, or using a FPGA, a PDL, a PLA or a PAL, or using discrete logic elements or discrete circuit elements. The particular form each of the circuits shown in FIGS. 1 and 7 will take is a design choice and will be obvious and predictable to those skilled in the art.

Figure 8:
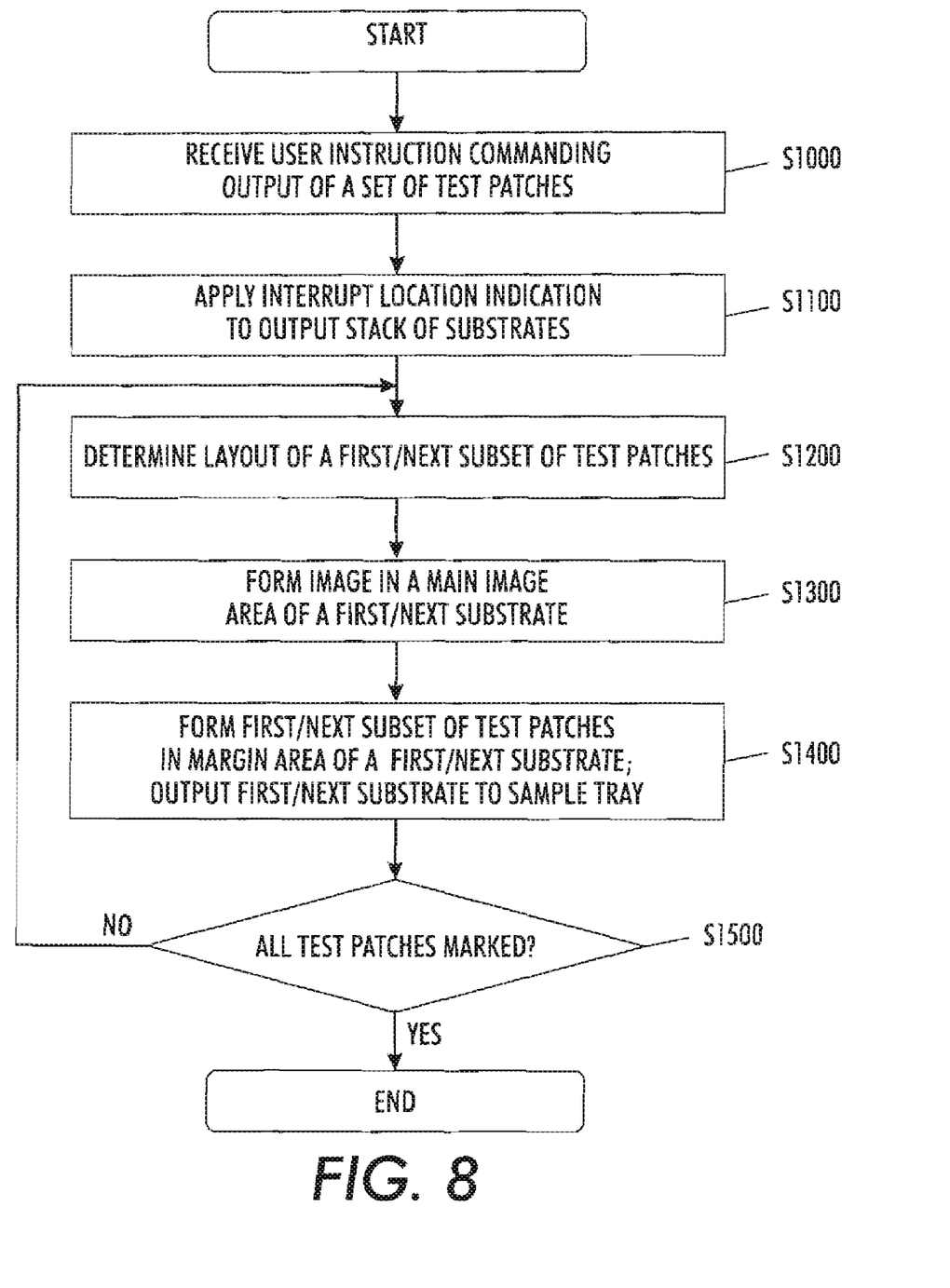
FIG. 8 is a flowchart illustrating a first exemplary method of forming a set of test patches for calibrating a marking device.

FIG. 8 is a flowchart illustrating a first exemplary method of forming a set of test patches for calibrating a marking device. In step S1000, a user instruction is received, which commands output of a set of test patches. Next, in step S1100, an interrupt location indication, such as described above, is applied to an output stack of marked substrates.

Continuing to step S1200, the process determines a layout of a subset of test patches on a first substrate. In step S1300, a user-defined image is marked in a main image area of the first substrate, and in step S1400, a first subset of test patches is marked in a margin area of the first substrate. It will be appreciated that steps S1300 and S1400 can be performed simultaneously.

Continuing to step S1500, it is determined whether all test patches of the test patch pattern have been marked. If all test patches have been marked, the process ends. Otherwise, the process returns to step S1200 and repeats steps S1200 through S1500 for second and, if necessary, subsequent, substrates. It will be appreciated, based on the foregoing description of FIGS. 4-6, for example, that it may not be necessary to separately determine a test patch layout for every substrate. Therefore, the process may return to step S1300, instead of S1200, and only repeat steps S1300 through S1500. Also, it will be appreciated from the foregoing description that some embodiments may not require step S1200.

Figure 9:
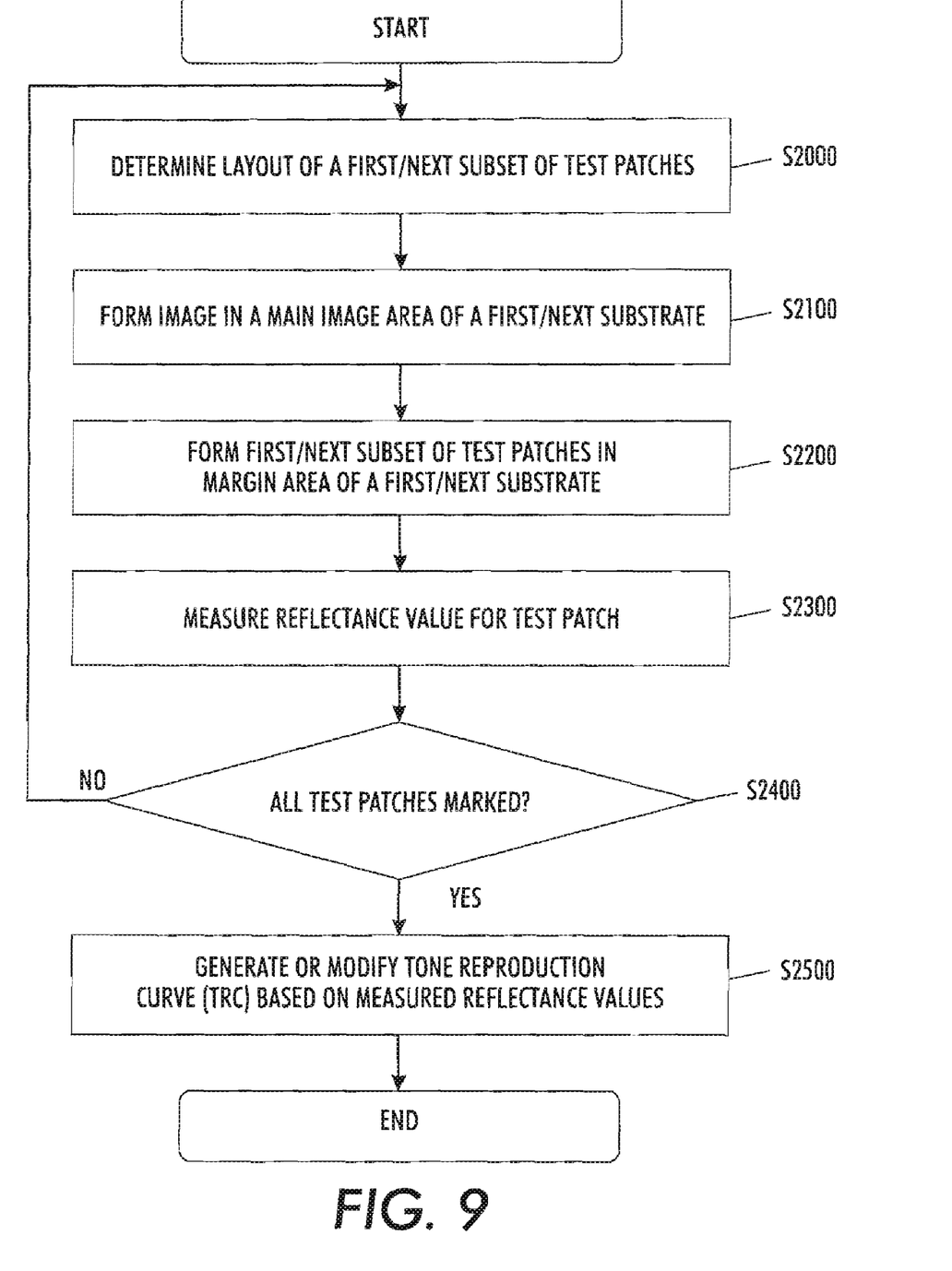
FIG. 9 is a flowchart illustrating a second exemplary method of forming a set of test patches for calibrating a marking device.

FIG. 9 is a flowchart illustrating a second exemplary method of forming a set of test patches for calibrating a marking device. In step S2000, the process determines a layout of a subset of test patches on a first substrate. In step S2100, a user-defined image is marked in a main image area of the first substrate, and in step S2200, a first subset of test patches is marked in a margin area of the first substrate. It will be appreciated that steps S2100) and S2200 can be performed simultaneously. Continuing to step S2300, a reflectance value is obtained for each test patch, using a spectrophotometer or the like.

Continuing to step S2400, it is determined whether all test patches of the test patch pattern have been marked. If all test patches have been marked, the process continues to S2500. Otherwise, the process returns to step S2000 and repeats steps S2000 through S2400 for second and, if necessary, subsequent, substrates. It will be appreciated, based on the foregoing description of FIGS. 4-6, for example, that it may not be necessary to separately determine a test patch layout for every substrate. Therefore, the process may return to step S2100, instead of S2000, and only repeat steps S2100 through S2400. Also, it will be appreciated from the foregoing description that some embodiments may not require step S2000.

In step S2500, a tone reproduction curve or other color calibration value or set of values is generated or modified using the measured reflectances, based on a comparison with pre-stored desired reflectances. The process then ends.

It will be appreciated that the steps of FIGS. 8-9 are not limited to the order shown. For example, in FIG. 9, step S2300 may be performed before step 2400, and measurement of reflectance values may begin after all test patches of the set have been marked.

Additionally, features collectively described above in connection with various embodiments may be combined. For example, the marking system 700 may include the marked substrate output device 160 of FIG. 1, including any or all of its subcomponents, and the method depicted in FIG. 8 may include steps corresponding to steps S2300 and S2500 of FIG. 9.

Appropriate portions of the marking system 100 of FIG. 1 and the marking system 700 of FIG. 7 are preferably implemented either on a single program general purpose computer or separate programmed general purpose computers. However, appropriate portions of the marking systems 100 and 700 can also be implemented on a special purpose computer, a programmed micro-processor or micro-controller and peripheral integrated circuit element, an ASIC or other integrated circuit, a digital signal processor, a hard-wired electronic or logic circuit such as a discrete element circuit, a programmable logic device such as a PLD, PLA, FPGA, PAL, or the like. In general, any device capable of implementing a finite state machine that is in turn capable of implementing the flowcharts shown in FIGS. 8-9, or appropriate portions thereof, can be used.

Furthermore, the disclosed methods may be readily implemented in software, such as by using object or object-oriented software development environments that provide portable source code that can be used on a variety of computer or workstation hardware platforms. Alternatively, appropriate portions of the disclosed marking systems 100 and 700 may be implemented partially or fully in hardware using standard logic circuits or a VLSI design. Whether software or hardware is used is dependent on the speed and/or efficiency requirements of the system, the particular function, and the particular software or hardware systems or microprocessor or microcomputer systems being utilized. The processing systems and methods described above, however, can be readily implemented in hardware or software using any known or later developed systems or structures, devices and/or software by those skilled in the applicable art without undue experimentation from the functional description provided herein together with a general knowledge of the computer arts.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A method of forming a set of test patches for calibrating a marking device and/or visually confirming color accuracy of the marking device, the method comprising:

forming a first user-defined image in a main image area of a first substrate;

forming a first subset of the test patches in a margin area of the first substrate, the margin area being located outside the main image area;

forming a second user-defined image in a main image area of a second substrate;

forming a second subset of the test patches in a margin area of the second substrate, the margin area being located outside the main image area; and forming additional subsets of test patches in margin areas of additional substrates as necessary until all test patches of the set of test patches have been formed.

2. The method of claim 1, further comprising:

obtaining reflectance values for each test patch in the subsets of test patches; and based on the reflectance values, performing a color calibration for use in a subsequent marking operation of the marking device.

3. The method of claim 2, wherein performing the color calibration comprises:

generating or modifying a tone reproduction curve based on the reflectance values.

4. The method of claim 1, further comprising dynamically determining an appropriate layout for each subset of test patches based on received image data corresponding to user-defined images, wherein a layout of test patches on the first substrate is not identical to a layout of test patches on the second substrate.

5. The method of claim 1, further comprising dynamically determining an appropriate layout for the subsets of test patches based on received image data corresponding to user-defined images, wherein a layout of test patches on the first substrate is identical to a layout of test patches on the second substrate during a first marking job, but a layout of test patches on substrates during a second marking job is different from the layout of test patches during the first marking job.

6. The method of claim 1, further comprising:

receiving a user instruction commanding output of the set of test patches as a sample;

applying an interrupt location indication to an output stack of substrates; and outputting the first and second substrates, as the sample, to a sample tray that is separate from the output stack of substrates.

7. A machine-readable medium on which is stored instructions that, when executed by a controller of a marking device, cause the controller and marking device to perform the method of claim 1.

8. A system comprising:

a marking device;

a test patch data storage area that stores data for producing a set of test patches;

a controller that causes the marking device, based on received image data and the stored target patch pattern, to (i) form a first user-defined image in a main image area of a first substrate, (ii) form a first subset of the test patches in a margin area of the first substrate, the margin area being located outside the main image area, (iii) form a second subset of the test patches in a margin area of the second substrate, the margin area being located outside the main image area, and (iv) form a second subset of the test patches in a margin area of the second substrate, the margin area being located outside the main image area, and (v) form additional subsets of test patches in margin areas of additional substrates as necessary until all test patches of the set of test patches have been formed.

9. The system of claim 8, further comprising:

a color measuring device that obtains reflectance value from each test patch of the set of test patches; and a color calibration value storage area that stores color calibration data;

wherein the controller determines a color calibration value, based on the reflectance values, and stores or modifies data in the color calibration value storage area based on the determined color calibration value.

10. The system of claim 9, wherein the color calibration data comprises a tone reproduction curve.

11. The system of claim 8, further comprising a test patch layout determination device that dynamically determines an appropriate layout for each subset of test patches based on received image data corresponding to user-defined images, wherein a layout of test patches on the first substrate is not identical to a layout of test patches on the second substrate.

12. The system of claim 8, further comprising a test patch layout determination device that dynamically determines an appropriate layout for the subsets of test patches based on received image data corresponding to user-defined images, wherein a layout of test patches on the first substrate is identical to a layout of test patches on the second substrate during a first marking job, but a layout of test patches on substrates during a second marking job is different from the layout of test patches during the first marking job.

13. The system of claim 8, further comprising:

a marked substrate output device that outputs substrates to an output stack, the marked substrate output device including (i) an interrupt location indication that applies an interrupt location indication to an output stack of substrates and (ii) a sample tray that is separate from the output stack of substrates; and a user interface that allows a user to input a user instruction commanding output of the set of test patches as a sample, wherein, when the user instruction commanding the formation of the set of test patches is received, (i) the interrupt location indication applies the interrupt location indication to the output stack of substrates, and (ii) the marked substrate output device outputs the first and second substrates, as the sample, to the sample tray.

14. The system of claim 8, wherein the system is a xerographic marking system.

15. The system of claim 8, wherein the system is an inkjet marking system.

* * * * *